(12) United States Patent
Li et al.

(10) Patent No.: US 9,226,150 B2
(45) Date of Patent: Dec. 29, 2015

(54) TRACKING DEVICE STATUS WITH RESPECT TO OTHER DEVICES AND ZONES OF A VIRTUAL GEO-FENCE (71) Applicant: Intel Corporation, Santa Clara, CA (US)

(72) Inventors: Hong C. Li, El Dorado Hills, CA (US); Rita H. Wouhaybi, Portland, OR (US); Rahul C. Shah, San Francisco, CA (US); Chieh-Yih Wan, Beaverton, OR (US); Douglas P. Bogia, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 111 days.

(21) Appl. No.: 13/830,687

(22) Filed: Mar. 14, 2013

(65) Prior Publication Data
US 2014/0273921 A1    Sep. 18, 2014

(51) Int. Cl.
H04M 11/00    (2006.01)
H04M 1/66     (2006.01)
H04W 12/06    (2009.01)
H04W 4/02     (2009.01)
H04W 4/08     (2009.01)

(52) U.S. Cl.
CPC .............. *H04W 12/06* (2013.01); *H04W 4/022* (2013.01); *H04W 4/023* (2013.01); *H04W 4/08* (2013.01)

(58) Field of Classification Search
CPC .......................... H04W 52/0219; H04W 40/20

USPC ........ 455/456.1, 405, 406, 456.3, 404.1, 411, 455/41.2; 370/254, 338; 705/14.58, 27.12
See application file for complete search history.

(56) References Cited

U.S. PATENT DOCUMENTS

| 2005/0159883 | A1 | 7/2005 | Humphries et al. |
| 2007/0143013 | A1 | 6/2007 | Breen |
| 2010/0017126 | A1 | 1/2010 | Holcman et al. |
| 2010/0235121 | A1* | 9/2010 | Constien et al. ................ 702/63 |
| 2010/0289644 | A1 | 11/2010 | Slavin et al. |
| 2013/0225196 | A1* | 8/2013 | James et al. ................ 455/456.1 |
| 2013/0267196 | A1* | 10/2013 | Leemet et al. ................ 455/405 |

FOREIGN PATENT DOCUMENTS

| KR | 10-2010-0118875 A | 11/2010 |
| WO | 2014/159099 A1 | 10/2014 |

OTHER PUBLICATIONS

International Search Report and Written Opinion received for PCT Patent Application No. PCT/US2014/021948, mailed on Jul. 18, 2014, 14 pages.

* cited by examiner

*Primary Examiner* — Kiet Doan
(74) *Attorney, Agent, or Firm* — Jordan IP Law, LLC (57) ABSTRACT

Systems and methods may provide for identifying a virtual geo-fence for a plurality of devices. Additionally, a condition may be detected with respect to two or more devices in the plurality of devices, wherein a status determination may be conducted as to whether at least one of the two or more devices has left the virtual geo-fence based on the condition.

27 Claims, 4 Drawing Sheets

TRACKING DEVICE STATUS WITH RESPECT TO OTHER DEVICES AND ZONES OF A VIRTUAL GEO-FENCE

TECHNICAL FIELD

Embodiments generally relate to managing devices. More particularly, embodiments relate to tracking mobile device status with respect to other mobile devices and zones of a virtual geo-fence.

BACKGROUND

Mobile device management may involve tracking a device such as a smart phone to determine whether the device is lost or stolen. Conventional mobile device tracking solutions may obtain GPS (Global Positioning System) coordinates for the mobile device and generating an alert if the GPS coordinates indicate that the mobile device is outside a predefined area. While such an approach may be suitable under certain circumstances, there remains considerable room for improvement. For example, GPS coordinates may not be available if the device is indoors or the GPS satellite constellation is otherwise inaccessible by the mobile device (e.g., due to tree coverage, weather conditions, etc.). As a result, tracking results may be inaccurate in many common settings. Moreover, typical users may lead highly mobile lifestyles that make establishing predefined areas difficult from a tracking standpoint.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
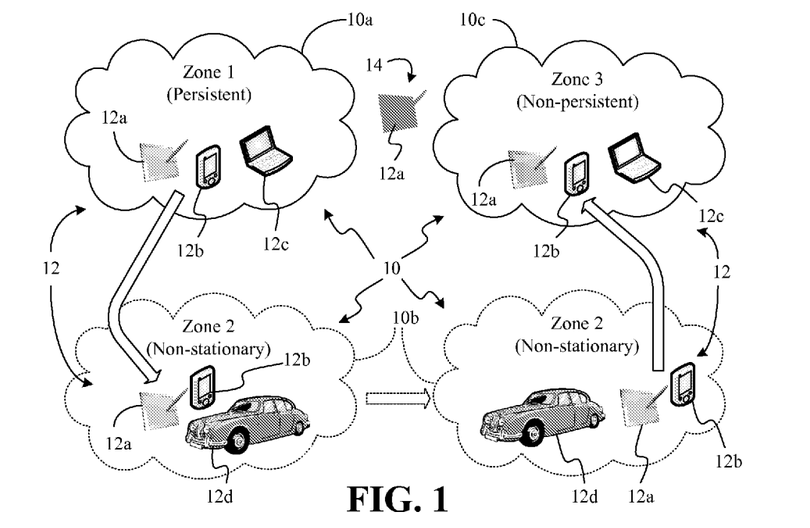
FIG. 1 is a block diagram of an example of a mobile device tracking scenario according to an embodiment.

Turning now to FIG. 1, a mobile device tracking scenario is shown in which a virtual geo-fence 10 (10a-10c) is defined for a plurality of devices 12 (12a-12d). The devices 12 may include, for example, a smart tablet 12a, a smart phone 12b, a notebook computer 12c, a vehicle 12d, and so forth, wherein the devices 12 may be associated with a single individual or different individuals of the same group (e.g., family members, friends, co-workers). The devices 12 may also include other types of devices such as Ultrabooks™, set-top boxes, printers, televisions, sensors embedded in fabric/shoes and other devices that may be subject to theft or loss. In one example, the smart tablet 12a, the smart phone 12b and the vehicle 12d might be associated with a parent of a particular family, whereas the notebook computer 12c may be associated with a child of that family. As will be discussed in greater detail, the devices 12 may be tracked relative to one another in a unique fashion that enables automated application initiation (e.g., telecommunications, takeover, data transfer), alert generation, separation mode operation (e.g., full or partial device disablement), partial or full take-over of another device's functions, etc., even as the devices 12 are carried to distant geographic areas lacking GPS coverage or other traditional location-based determination solutions.

Zones

In general, the illustrated virtual geo-fence 10 includes a plurality of zones that may be disjoint from one another and different in nature. More particularly, the zones of the virtual geo-fence 10 may be persistent (e.g., "safety zone"), non-persistent (e.g., "temporary safety zone"), non-stationary (e.g., "safety corridor"), etc., or any combination thereof. For example, the illustrated zone 10a ("Zone 1") is a persistent zone that the devices 12 visit frequently or is defined explicitly by the user as a safety place. The persistent zone 10a might therefore correspond to a home location in the scenario of a group of family members operating the devices 12.

The illustrated zone 10c ("Zone 3"), on the other hand, is a non-persistent zone that is considered safe based on a temporary condition, such as a certain period of time. As long as the condition is true, the devices 12 may roam the non-persistent zone 10c without triggering other actions or alerts. Thus, the non-persistent zone 10c may correspond to, for example, a soccer field that one or more family members periodically visit for practices or games, a hotel in which a family member is staying for a fixed amount of time, and so forth.

The illustrated zone 10b ("Zone 2") may be a non-stationary zone representing an area/corridor that is safe as long as two or more of the devices 12 are traveling together, where the vehicle 12d may be considered a mobile device. The speed of the devices 12 (e.g., as sensed via accelerometer, gyroscope, etc.) may be used to determine whether two or more of the devices 12 are traveling together. Of particular note is that non-stationary zones may be defined on-the-fly in the virtual geo-fence 10 as conditions change. For example, one or more "anchor" devices may be designated among the plurality of devices 12, wherein the anchor device may move freely, and when doing so creates a safety corridor for other devices. The creation of the non-stationary zone may be subject to user authentication, as will be discussed in greater detail.

Additional policies could be added to the system to account for cases where only one device is moving. For example, such a scenario might involve someone driving the vehicle 12d without any other device being detected within proximity (e.g., maybe a cell phone's battery is dead). Another example may involve a person jogging with only their smart phone (e.g., attached to an armband, in a pocket, etc.). In these cases, the user may authenticate the device in order to authorize these exceptions.

Thus, the smart phone 12b might be designated as an anchor device so that when the smart tablet 12a leaves the persistent zone 10a but remains within proximity of the smart phone 12b, the non-stationary zone 10b is created on a real-time/ad hoc basis. Other devices such as the vehicle 12d may also be designated as anchor devices. Additionally, one or more devices in the non-stationary zone 10b may conduct a user authentication to ensure that they are traveling with the owner and not some other individual. The authentication may be sensor based, such as gait or voice based authentication, or based on more traditional techniques such as passwords or fingerprints. Once the user has been authenticated on one of the devices in the non-stationary zone 10b, all devices in the non-stationary zone 10b may share the same level of trust with the user. In the illustrated example, when the devices in the non-stationary zone 10b reach the non-persistent zone 10c, device policies of the non-persistent zone 10c may become applicable.

Device Policies

As will be discussed in greater detail, the devices 12 may be paired with one another so that status updates with respect to the virtual geo-fence 10 may be made on a device proximity basis as specified by device policies. For example, a device policy may indicate that the smart tablet 12a is considered "safe" when it is within the persistent zone 10a, within the non-persistent zone 10c, or within proximity of either the smart phone 12b or the vehicle 12d. In such a case, if the smart tablet 12a moves to a location 14 that is not recognized by the device policy, the loss of proximity between the smart tablet 12a and the other devices may cause the generation of an alert such as an email, text message, instant message (IM), audible noise, vibratory output, and so forth, via the smart tablet 12a and/or one of the other devices remaining in a safe zone to notify the user of the potential loss or theft of the smart tablet 12a (e.g., status change).

Similarly, device policies may distinguish between lost devices and devices that are merely temporarily out of reach. For example, a device policy may indicate that the notebook computer 12c is considered "safe" when it is within the persistent zone 10a, within the non-persistent zone 10c, or within proximity of either the smart phone 12b or the vehicle 12d. In such a case, if both the smart phone 12b and the vehicle 12d lose proximity with respect to the notebook computer 12c while the notebook computer 12c remains in either the persistent zone 10a or the non-persistent zone 10c (subject to applicable time constraints), an alert might be generated to notify the user that the notebook computer 12c is safe but temporarily out of reach.

Other functions such as initiating telecommunications, takeover (e.g., remote control, proxy, etc.) and/or data transfer applications on the remaining "safe" devices, disabling the lost device (e.g., fully or partially), and so forth, may also be conducted based on a loss of proximity as specified in a particular device policy. For example, a lost device may be placed in a separation mode in which the device would not function for the user beyond accepting authentication input and/or attempting to alert the owner of its location. Thus, the device policy, which may be programmed (e.g., based on user input) and/or learned (e.g., based on historical usage data), may provide a tracking solution that leverages information about usage conditions that occur naturally during modern, highly mobile lifestyles.

Battery Life

Conditions other than loss of proximity may also be used to implement the device policies. For example, a loss of battery life in a device within the virtual geo-fence 10 may be used to initiate applications and/or alerts. Thus, if the notebook computer 12c is within the persistent zone 10a and determines that its battery life has fallen below a particular level, the notebook computer 12c may issue a battery life message to the smart tablet 12a and/or smart phone 12b. Upon receiving the battery life message, the smart tablet 12a and/or smart phone 12b may automatically initiate a data transfer application to backup/synchronize sensitive data (e.g., emails, files, etc.) from the notebook computer 12c to those devices.

In yet another example, if the smart phone 12b determines that its battery life has fallen below a particular level, the smart phone 12b may issue a battery life message to the smart tablet 12a and/or notebook computer 12c. Upon receiving the battery life message, the smart tablet 12a and/or notebook computer 12c may automatically initiate a telecommunications application such as a voice over Internet protocol (VOIP) application or a cell phone modem application, wherein initiating the telecommunications application may enable those devices to assume call handling responsibility for the smart phone 12b.

Figure 2:
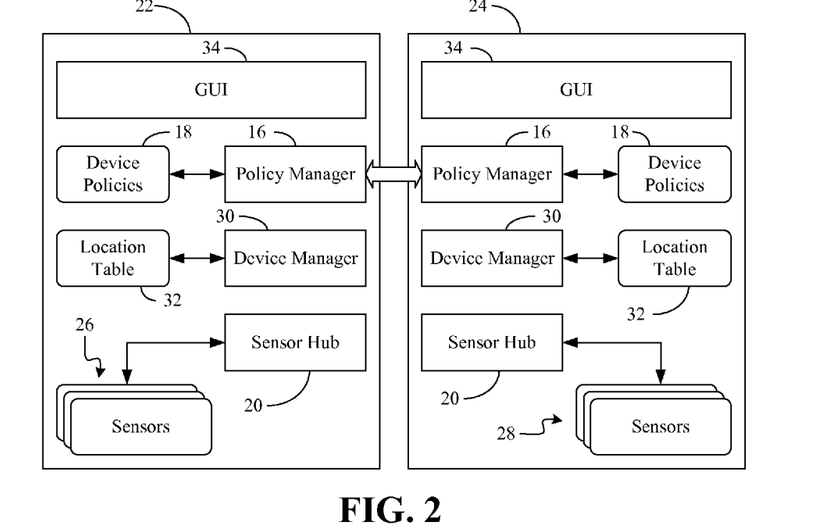
FIG. 2 is a block diagram of an example of a plurality of devices according to an embodiment.

FIG. 2 shows a plurality of devices 22, 24 that support the virtual geo-fence functionality described herein. The devices 22, 24, may generally be substituted for two or more of the devices 12 (FIG. 1), already discussed. In the illustrated example, each mobile device 22, 24 includes a policy manager 16 that identifies a virtual geo-fence for the devices 22, 24, wherein the virtual geo-fence includes a plurality of zones. The policy manager 16 may identify the virtual geo-fence based on user input collected via a graphical user interface (GUI) 34 and/or based on historical usage data. Additionally, the zones of the virtual geo-fence, which may be disjoint from one another, may be reflected in one or more device policies 18. For example, a particular device policy might be specified as follows in Table I:

TABLE I

Device Policy

Device: Dev_B (Smart Phone)
Zone_1:

Type = Persistent
Location = [AP_1]
Device_Group = [Dev_A, Dev_C]
Zone_2:

Type = Non-stationary
Location = [coordinates]
Device_Group = [Dev_A, Dev_C, Dev_D]
Zone_3:

Type = Non-persistent
Location = [coordinates]
Device_Group = [Dev_A, Dev_C, Dev_D]
Alerts:

Battery_life <7%
Disable?:

Yes
Applications:

VOIP
Email_sync

Thus, the device policy shown in Table I might correspond to the smart phone 12b (FIG. 1), wherein the zone type, location (e.g., wireless access point/AP identifier, GPS coordinates) and device group may be defined for each zone in the virtual geo-fence. Additionally, alert conditions, device disablement settings and applications to be initiated in response to status changes may also be defined for the device in question. Although the illustrated example demonstrates device behaviors that are specific to zones, other approaches may also be used. For example, device behaviors may be a combination of zone-specific with a "global" backup behavior. Thus, a device's behavior may be different when it is left behind in a persistent zone versus a non-persistent zone. Alternatively, the behaviors may be grouped by zone type. The policy managers 16 of the devices 22, 24 may share the device policies 18 with one another or maintain independent device policies 18, as appropriate.

The illustrated devices 22, 24 also include a sensor hub 20 that detects conditions with respect to the devices 22, 24, wherein the conditions may correspond to data collected from sensors 26, 28 on the devices 22, 24, respectively. The sensors 26, 28 may include, for example, accelerometer, gyroscope, magnetometer, near field communications (NFC), cellular telephone (e.g., Wideband Code Division Multiple Access/ W-CDMA (Universal Mobile Telecommunications System/ UMTS), CDMA2000 (IS-856/IS-2000), etc.), WiFi (Wireless Fidelity, e.g., Institute of Electrical and Electronics Engineers/IEEE 802.11-2007, Wireless Local Area Network/ LAN Medium Access Control (MAC) and Physical Layer (PHY) Specifications), 4G LTE (Fourth Generation Long Term Evolution), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony sensors. Thus, the detected conditions may indicate a loss of proximity between the devices 22, 24, a loss of battery life in one of the devices 22, 24, a departure from a particular zone, and so forth.

A device manager 30 may conduct status determinations as to whether at least one of the devices 22, 24 is within the virtual geo-fence based on the detected conditions. In one example, the device manager 30 maintains a location table 32 to determine and track the location of the devices 22, 24. The location table 32 may be shared between the devices 22, 24 or maintained on a standalone basis, as appropriate. The device manager 30 may therefore initiate applications based on the status determinations, wherein the applications might include, for example telecommunications and/or data transfer applications. If the devices 22, 24 run different operating systems (OS's), a virtual machine (VM) that can support the OS may be used to manage the transfer of information between the devices 22, 24. Additionally, the device manager 30 may generate alerts based on the status determinations, wherein the alerts indicate that at least one of the devices 22, 24 is outside one of the plurality of zones (e.g., lost, stolen) or temporarily out of reach. The device manager 30 may also conduct user authentications via the GUI 34, and share trust levels between the devices 22, 24 if the user authentications are successful.

Figure 3:
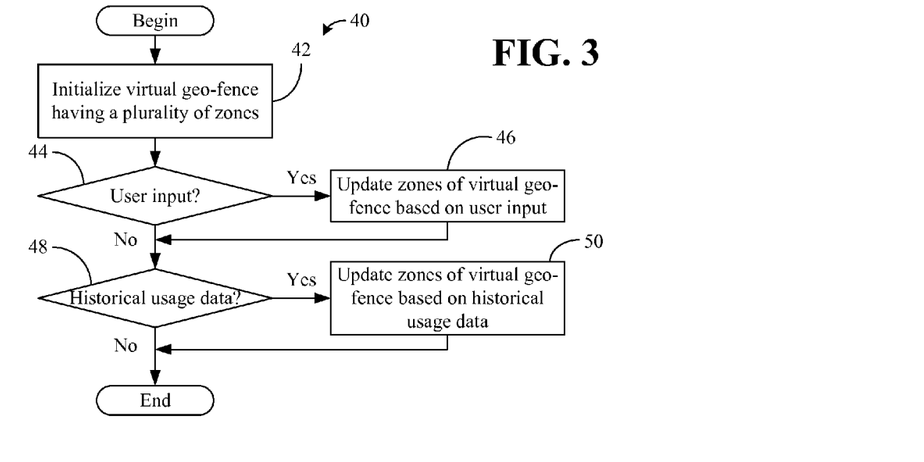
FIG. 3 is a flowchart of an example of a method of identifying a virtual geo-fence according to an embodiment.

Turning now to FIG. 3, a method 40 of identifying a virtual geo-fence is shown. The method 40 may be implemented as a set of logic instructions and/or firmware stored in a machine- or computer-readable medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 40 may be written in any combination of one or more programming languages, including an object oriented programming language such as C++ or the like and conventional procedural programming languages, such as the "C" programming language or similar programming languages. Moreover, the method 40 may be implemented using any of the aforementioned circuit technologies.

Illustrated processing block 42 provides for initializing a virtual geo-fence having a plurality of zones. As already noted, the plurality of zones may include one or more of a non-persistent zone, a persistent zone and a non-stationary zone, wherein two or more of the plurality of zones may be disjoint from one another. A determination may be made at block 44 as to whether user input has been received with regard to the virtual geo-fence. If so, illustrated block 46 updates one or more zones of the virtual geo-fence based on the user input. Block 46 may therefore involve creating, editing and/or deleting a device policy such as the device policy reflected in Table I, already discussed.

A determination may also be made at block 48 as to whether historical usage data is available. The historical usage data may include, for example, data identifying the locations in which a particular device has been used, data identifying other devices that have been detected within proximity of the particular device, time/date data, and so forth. If historical usage data is available, illustrated block 50 updates one or more zones of the virtual geo-fence based on the historical usage data. Block 50 may therefore enable user behaviors to be learned and applied to the device management architecture.

Figure 4:
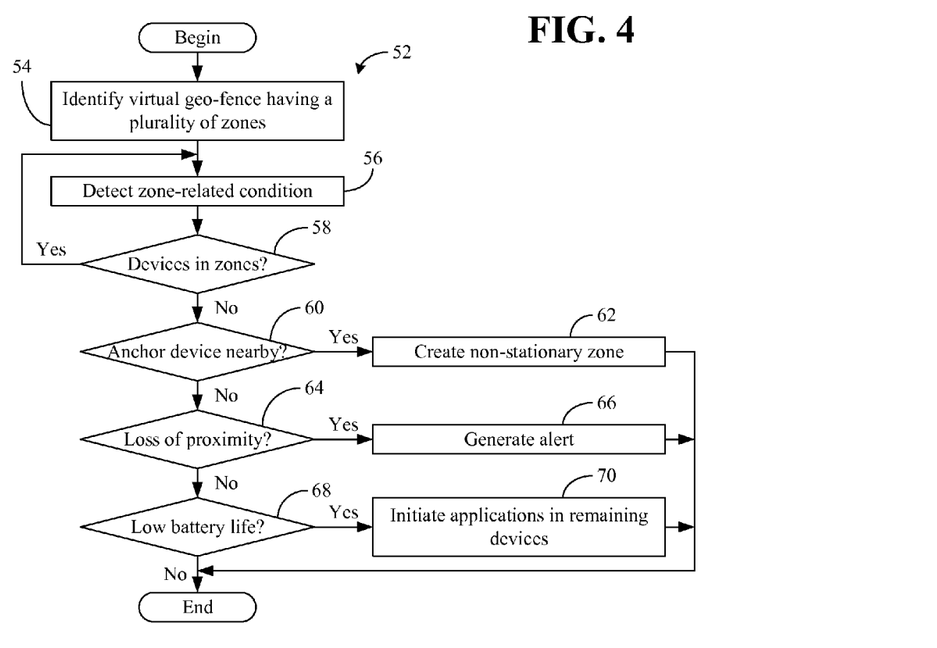
FIG. 4 is a flowchart of an example of a method of managing a plurality of devices according to an embodiment.

FIG. 4 is a method 52 of managing a plurality of devices. The method 52 may be implemented as a set of logic instructions and/or firmware stored in a machine- or computer-readable medium such as RAM, ROM, PROM, flash memory, etc., in configurable logic such as, for example, PLAs, FPGAs, CPLDs, in fixed-functionality logic hardware using circuit technology such as, for example, ASIC, CMOS or TTL technology, or any combination thereof. Illustrated block 54 provides for identifying a virtual geo-fence having one or more zones. Block 54 may therefore implement a process such as the process demonstrated in method 40 (FIG. 3), already discussed.

Block 56 may detect a zone-related condition, wherein a determination may be made at block 58 as to whether at least one of the plurality of devices complies with its corresponding device policy (e.g., all devices are within a recognized zone of the virtual geo-fence). If so, the process may repeat and/or wait for the next zone-related condition to be detected. Otherwise, illustrated block 60 determines whether an anchor device is within proximity of (e.g., nearby) a mobile device that is outside the virtual geo-fence. If an anchor device is detected, block 62 may create a non-stationary zone such as, for example, the non-stationary zone 10b (FIG. 1), and add the non-stationary zone to the virtual geo-fence, wherein the newly added non-stationary zone may be considered a "safe corridor". Block 60 may also involve determining a speed of two or more devices within the non-stationary zone and/or conducting a user authentication, wherein block 62 may provide for sharing a trust level between devices in the non-stationary zone or other type of zone if the authentication is successful.

If no anchor device is detected, illustrated block 64 determines whether the zone-related condition indicates a loss of proximity between two or more devices. If so, block 66 may generate an alert to notify one or more users that a mobile device is potentially lost or stolen (e.g., if the mobile device is not within a zone of the virtual geo-fence) and/or temporarily out of reach (e.g., if the mobile device is within a zone of the virtual geo-fence). Other functionality such as disabling a lost, stolen or temporarily out of reach devices may also be implemented.

While the illustrated example may be conducted from the perspective of a single device, multiple different checks and cross-checks may be run between the devices. For example, each of the devices that are part of a zone may check on itself and the other devices in the zone on a configurable or automatic basis, depending on the device. When one device is determined to be outside the zone, that device may provide a warning/authentication and potentially conduct a shutdown of various functions except those needed to assist in locating the lost device (e.g., sending short messaging service/SMS messages with global positioning system/GPS coordinates). The other devices that were in the same zone may also warn that a device has been separated from the zone (e.g., the other devices, too, may raise alerts). Such an approach may provide very quick notification to the owner that devices have become separated, assuming the owner is still in contact with any of the devices that were in the zone together.

Illustrated block 68 determines whether the zone-related condition indicates a low battery life status in a mobile device (e.g., a battery life message/event has been received from the mobile device). If so, one or more applications may be initiated in at least one of the devices remaining within the virtual geo-fence at block 70. The applications may include, for example, telecommunications applications, takeover applications, data transfer applications, and so forth. In this regard, events may be raised as devices enter and leave the virtual geo-fenced area, wherein additional context information may be associated with enter and leave events to provide information about the conditions causing the enter or leave event.

For example, a device might generate a leave event due to its battery being depleted. Moreover, actions may be assigned to these events to automate tasks. One example action might be transferring a phone number to a laptop when a cell phone raises the battery depleted leave event. Alternatively, the phone number could be transferred on detection of an entry event in order to conserve the phone battery so that it does not reach a depleted state.

Figure 5:
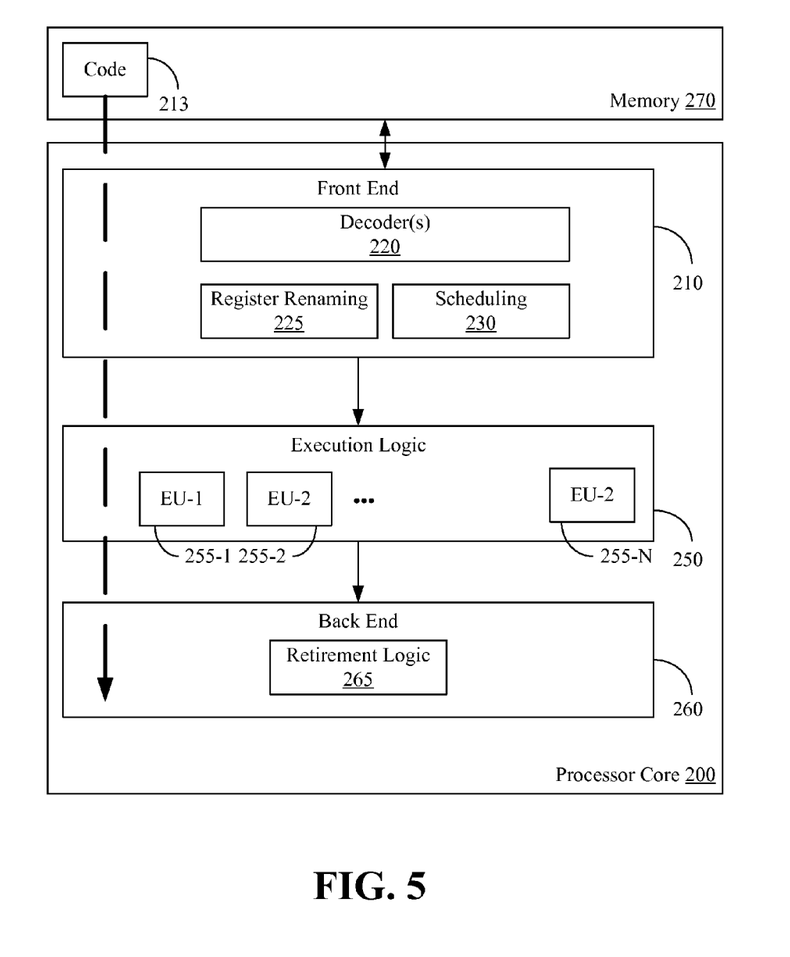
FIG. 5 is a block diagram of an example of a processor according to an embodiment.

FIG. 5 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 5, a processing element may alternatively include more than one of the processor core 200 illustrated in FIG. 5. The processor core 200 may be a single-threaded core or, for at least one embodiment, the processor core 200 may be multithreaded in that it may include more than one hardware thread context (or "logical processor") per core.

FIG. 5 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the method 40 (FIG. 3) and/or the method 52 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 5, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 6:
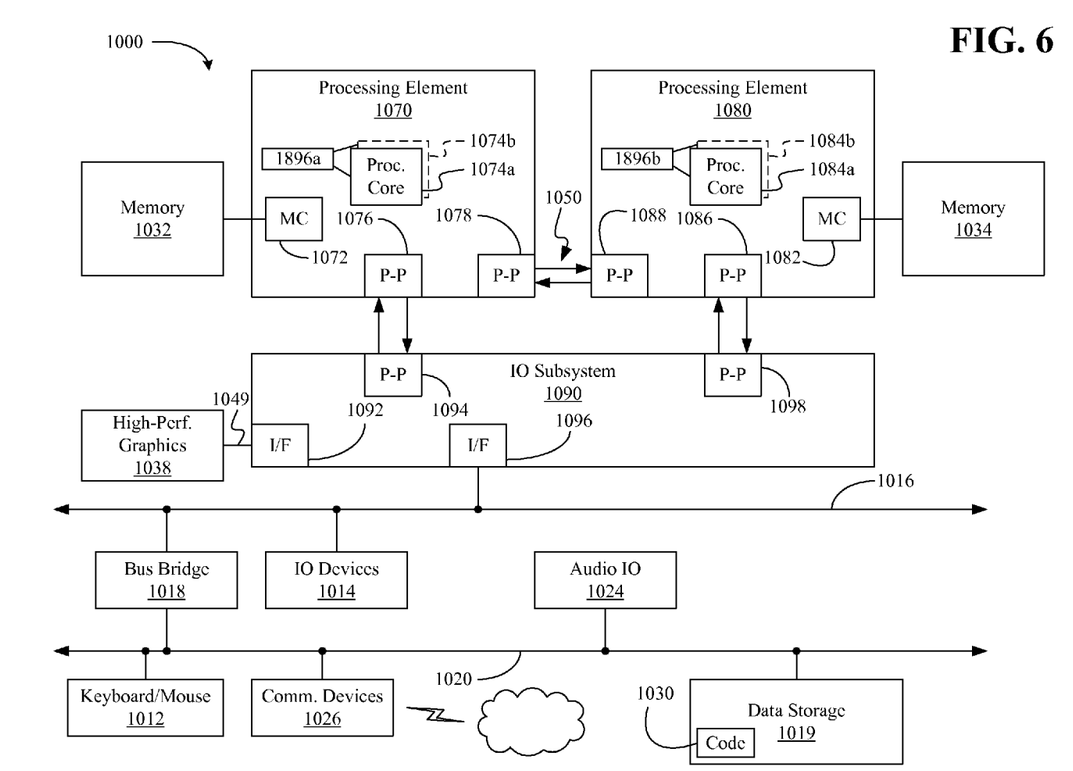
FIG. 6 is a block diagram of an example of a system according to an embodiment.

Referring now to FIG. 6, shown is a block diagram of a system 1000 embodiment in accordance with an embodiment. Shown in FIG. 6 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 6 may be implemented as a multi-drop bus rather than point-to-point interconnect.

As shown in FIG. 6, each of processing elements 1070 and 1080 may be multicore processors, including first and second processor cores (i.e., processor cores 1074*a* and 1074*b* and processor cores 1084*a* and 1084*b*). Such cores 1074*a*, 1074*b*, 1084*a*, 1084*b* may be configured to execute instruction code in a manner similar to that discussed above in connection with FIG. 5.

Each processing element 1070, 1080 may include at least one shared cache 1896. The shared cache 1896*a*, 1896*b* may store data (e.g., instructions) that are utilized by one or more components of the processor, such as the cores 1074*a*, 1074*b* and 1084*a*, 1084*b*, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 6, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 6, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments is not so limited.

As shown in FIG. 6, various I/O devices 1014 may be coupled to the first bus 1016, along with a bus bridge 1018 which may couple the first bus 1016 to a second bus 1020. The I/O devices 1014 may include a sensor hub and/or one or more sensors such as, for example, the sensor hub 20 (FIG. 2) and/or sensors 26, 28 (FIG. 2), already discussed. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. In one example, web content is received via the communication devices 1026. The code 1030 may include instructions for performing embodiments of one or more of the methods described above. Thus, the illustrated code 1030 may implement the method 40 (FIG. 3) and/or the method 52 (FIG. 4), and may be similar to the code 213 (FIG. 5), already discussed. Further, an audio I/O 1024 may be coupled to second bus 1020.

Note that other embodiments are contemplated. For example, instead of the point-to-point architecture of FIG. 6, a system may implement a multi-drop bus or another such communication topology. Also, the elements of FIG. 6 may alternatively be partitioned using more or fewer integrated chips than shown in FIG. 6.

Additional Notes and Examples:

Example one may include a method of managing devices comprising identifying a virtual geo-fence for a plurality of devices. Example one may also include detecting a condition with respect to two or more devices in the plurality of devices, and conducting a status determination as to whether at least one of the two or more devices has left the virtual geo-fence based on the condition.

Additionally, the virtual geo-fence in the method of example one may include a plurality of zones having one or more of a non-persistent zone, a persistent zone and a non-stationary zone.

Additionally, the non-stationary zone in the method of example one may be associated with an anchor device in the plurality of devices, wherein the method further includes determining that the two or more devices remain together.

Moreover, the method of example one may further include conducting a user authentication, and sharing a level of trust with one or more other devices in the non-stationary zone if the user authentication is successful.

In addition, the method of example one may further include initiating an application on at least one of the two or more devices based on the status determination, wherein the application includes one or more of a telecommunications application, a takeover application and a data transfer application.

In addition, the method of example one may further include generating one or more alerts based on the status determination, wherein the one or more alerts indicate that at least one of the two or more devices is outside one of the plurality of zones.

Moreover, the method of example one may further include placing at least one of the two or more devices in a separated mode based on the status determination.

Additionally, detecting the condition in the method of example one may include sensing a loss of proximity between the two or more devices.

Additionally, detecting the condition in the method of example one may include receiving a battery life message from at least one of the two or more devices.

Moreover, identifying the virtual geo-fence in the method of example one may include defining one or more of the plurality of zones based on one or more of user input and historical usage data.

Example two may include an apparatus to manage devices, wherein the apparatus includes a policy manager to identify a virtual geo-fence for a plurality of devices, a sensor hub to detect a condition with respect to two or more devices in the plurality of devices, and a device manager to conduct a status determination as to whether at least one of the two or more devices has left the virtual geo-fence based on the condition.

Additionally, the virtual geo-fence in the apparatus of example two may include a plurality of zones having one or more of a non-persistent zone, a persistent zone and a non-stationary zone.

Additionally, the non-stationary zone in the apparatus of example two may be associated with an anchor device in the plurality of devices, wherein the device manager is to determine that the two or more devices remain together.

Moreover, the device manager in the apparatus of example two may conduct a user authentication and share a level of trust with one or more other devices in the non-stationary zone if the user authentication is successful.

In addition, the device manager in the apparatus of example two may initiate an application based on the status determination, wherein the application includes one or more of a telecommunications application, a takeover application and a data transfer application.

In addition, the device manager in the apparatus of example two may generate one or more alerts based on the status determination, wherein the one or more alerts indicate that at least one of the two or more devices is outside one of the plurality of zones.

Moreover, the device manager in the apparatus of example two may place at least one of the two or more devices in a separated mode based on the status determination.

Additionally, the sensor hub in the apparatus of example two may sense a loss of proximity between the two or more devices to detect the condition.

In addition, the sensor hub in the apparatus of example two may receive a battery life message from at least one of the two or more devices to detect the condition.

In addition, the policy manager in the apparatus of example two may define one or more of the plurality of zones based on one or more of user input and historical usage data.

Example three may include at least one computer readable storage medium comprising a set of instructions which, if executed by a computing device, cause the computing device to perform the method of example one.

Example four may include an apparatus to manage a plurality of devices, wherein the apparatus includes means for performing the method of example one.

Techniques described herein may therefore use sensing technologies to recognize devices belonging to the same entity (e.g., family, company, social circle). As a result, the collective of these devices may be used to track one another, forming groups as needed and alarming users of any anomalies. The device policies created may be dynamic or user edited. Simply put, in addition to physically geo-fenced areas such as "home" or "work", temporary, relative zones may be established based on devices (or groups of devices), that are carried around from one location to another. Moreover, automatic, context-aware actions may be taken based on the detected zone-related conditions and corresponding status determinations.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size may be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus to manage devices, comprising:
a policy manager to identify a virtual geo-fence for a plurality of devices;
a sensor hub to detect a condition with respect to two or more devices in the plurality of devices, wherein the condition includes at least a proximity of at least one of the two or more devices to at least another of the two or more devices; and
a device manager to conduct a status determination as to whether at least one of the two or more devices has left the virtual geo-fence based on the condition,
wherein at least one of the two or more devices is to be tracked relative to another of the two or more devices to enable one or more automated functions of at least one of the two or more devices, and the sensor hub is to receive a battery life message from at least one of the two or more devices to detect the condition.

2. The apparatus of claim 1, wherein the virtual geo-fence is to include a plurality of zones having one or more of a non-persistent zone, a persistent zone and a non-stationary zone.

3. The apparatus of claim 2, wherein the non-stationary zone is to be associated with an anchor device in the plurality of devices, and wherein the device manager is to determine that the two or more devices remain together.

4. The apparatus of claim 2, wherein the device manager is to conduct a user authentication and share a level of trust with one or more other devices in the non-stationary zone if the user authentication is successful.

5. The apparatus of claim 1, wherein the device manager is to initiate an application based on the status determination, and wherein the application includes one or more of a telecommunications application, a takeover application and a data transfer application.

6. The apparatus of claim 1, wherein the device manager is to generate one or more alerts based on the status determination, wherein the one or more alerts indicate that at least one of the two or more devices is outside one of the plurality of zones.

7. The apparatus of claim 1, wherein the device manager is to place at least one of the two or more devices in a separated mode based on the status determination.

8. The apparatus of claim 1, wherein the sensor hub is to sense a loss of proximity between the two or more devices to detect the condition.

9. The apparatus of claim 1, wherein the policy manager is to define one or more of the plurality of zones based on one or more of user input and historical usage data.

10. A method of managing devices, comprising:
identifying a virtual geo-fence for a plurality of devices;
detecting a condition with respect to two or more devices in the plurality of devices, wherein the condition includes at least a proximity of at least one of the two or more devices to at least another of the two or more devices; and
conducting a status determination as to whether at least one of the two or more devices has left the virtual geo-fence based on the condition,
wherein at least one of the two or more devices is tracked relative to another of the two or more devices to enable one or more automated functions of at least one of the two or more devices, and detecting the condition includes receiving a battery life message from at least one of the two or more devices.

11. The method of claim 10, wherein the virtual geo-fence includes a plurality of zones having one or more of a non-persistent zone, a persistent zone and a non-stationary zone.

12. The method of claim 11, wherein the non-stationary zone is associated with an anchor device in the plurality of devices, and wherein the method further includes determining that the two or more devices remain together.

13. The method of claim 1, further including:
conducting a user authentication; and
sharing a level of trust with one or more other devices in the non-stationary zone if the user authentication is successful.

14. The method of claim 10, further including initiating an application on at least one of the two or more devices based on the status determination, wherein the application includes one or more of a telecommunications application, a takeover application and a data transfer application.

15. The method of claim 10, further including generating one or more alerts based on the status determination, wherein the one or more alerts indicate that at least one of the two or more devices is outside one of the plurality of zones.

16. The method of claim 10, further including placing at least one of the two or more devices in a separated mode based on the status determination.

17. The method of claim 10, wherein detecting the condition includes sensing a loss of proximity between the two or more devices.

18. The method of claim 10, wherein identifying the virtual geo-fence includes defining one or more of the plurality of zones based on one or more of user input and historical usage data.

19. At least one non-transitory computer readable storage medium comprising a set of instructions which, if executed by a computing device, cause the computing device to:
identify a virtual geo-fence for a plurality of devices;
detect a condition with respect to two or more devices in the plurality of devices, wherein the condition includes at least a proximity of at least one of the two or more devices to at least another of the two or more devices; and conduct a status determination as to whether at least one of the two or more devices has left the virtual geo-fence based on the condition, wherein at least one of the two or more devices is to be tracked relative to another of the two or more devices to enable one or more automated functions of at least one of the two or more devices, and wherein the instructions, if executed, cause a computing device to receive a battery life message from at least one of the two or more devices to detect the condition.

20. The at least one medium of claim 19, wherein the virtual geo-fence is to include a plurality of zones having one or more of a non-persistent zone, a persistent zone and a non-stationary zone.

21. The at least one medium of claim 20, wherein the non-stationary zone is to be associated with an anchor device in the plurality of devices, and wherein the instructions, if executed, cause a computing device to determine that the two or more devices remain together.

22. The at least one medium of claim 20, wherein the instructions, if executed, cause a computing device to:
conduct a user authentication; and
share a level of trust with one or more other devices in the non-stationary zone if the user authentication is successful.

23. The at least one medium of claim 19, wherein the instructions, if executed, cause a computing device to initiate an application based on the status determination, and wherein the application includes one or more of a telecommunications application, a takeover application and a data transfer application.

24. The at least one medium of claim 19, wherein the instructions, if executed, cause a computing device to generate one or more alerts based on the status determination, wherein the one or more alerts indicate that at least one of the two or more devices is outside one of the plurality of zones.

25. The at least one medium of claim 19, wherein the instructions, if executed, cause a computing device to place at least one of the two or more devices in a separated mode based on the status determination.

26. The at least one medium of claim 19, wherein the instructions, if executed, cause a computing device to sense a loss of proximity between the two or more devices to detect the condition.

27. The at least one medium of claim 19, wherein the instructions, if executed, cause a computing device to define one or more of the plurality of zones based on one or more of user input and historical usage data.

* * * * *